UNITED STATES PATENT OFFICE 2,032,272

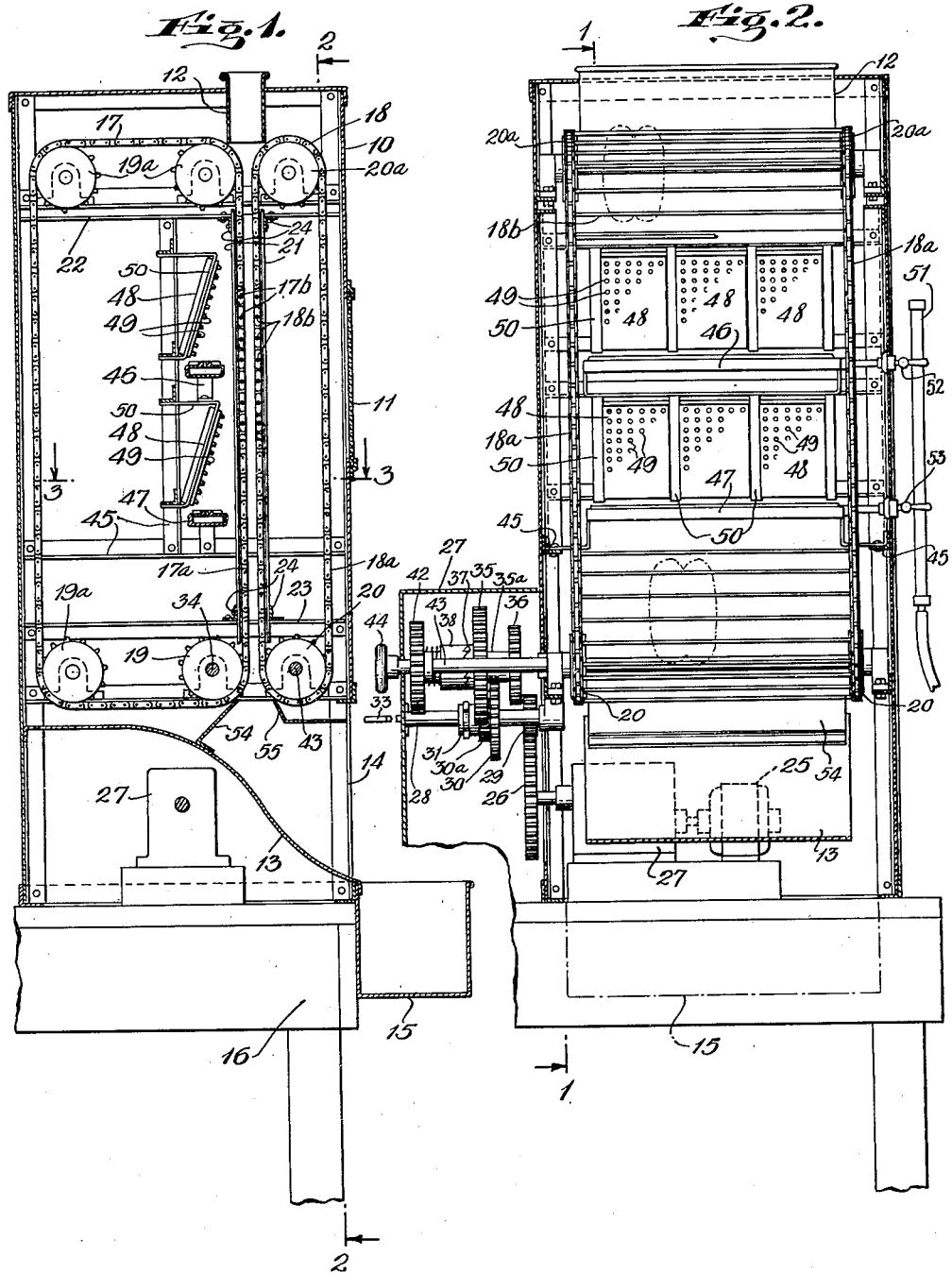

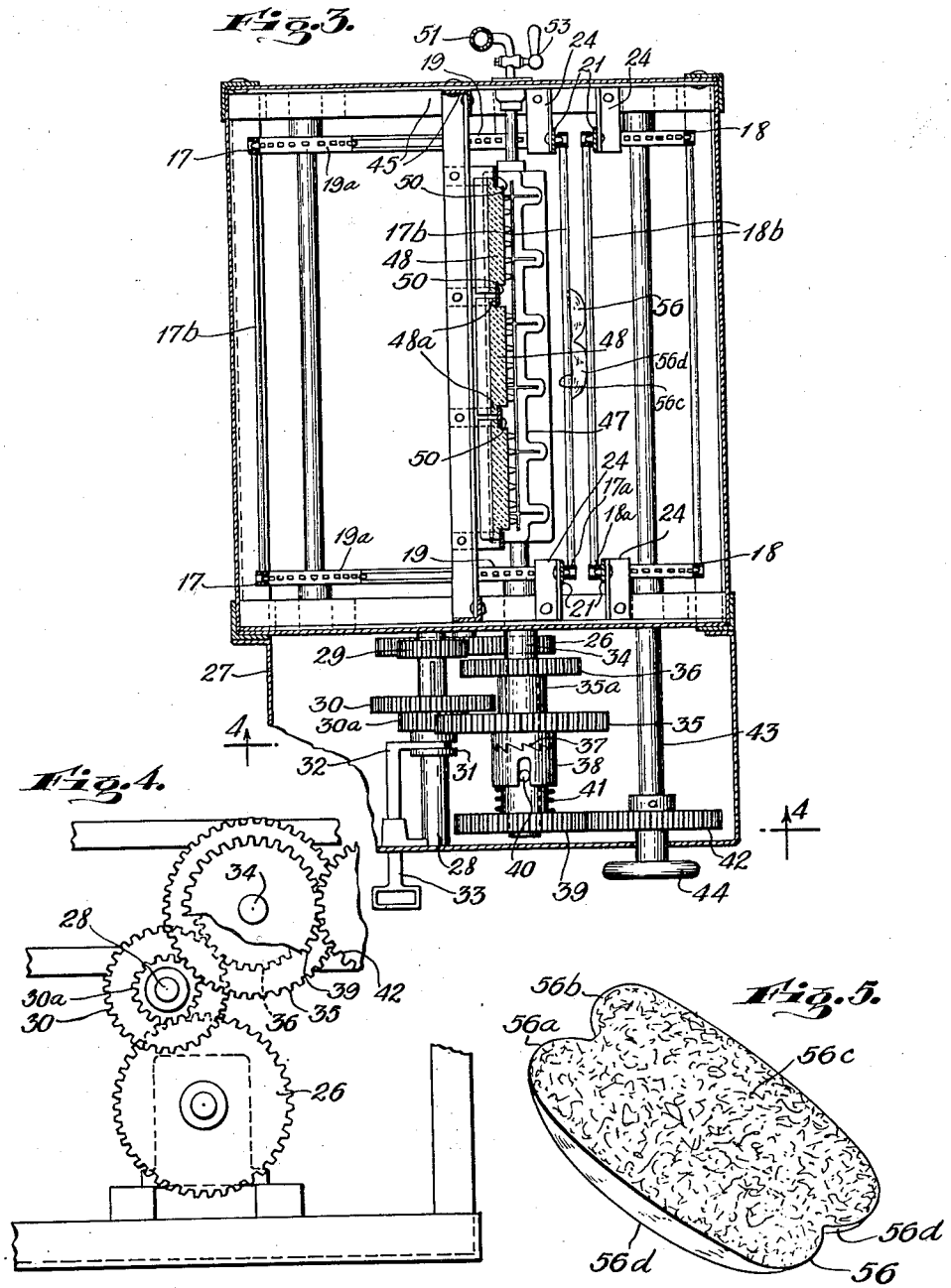

TOASTING AND SIMILAR APPARATUS

Charles A. Feltman, Brooklyn, N. Y.

Application January 31, 1935, Serial No. 4,324

20 Claims. (Cl. 53—5)

This invention relates to a machine or apparatus designed primarily as a toaster which may be used for other purposes and more particularly to toast rolls and similar uneven food products; and the object of the invention is to provide an apparatus involving a casing in which is arranged a grill consisting of a plurality of refractory elements arranged in groups with a separate heating medium cooperating with each group to control and regulate heat radiation therefrom; a further object being to provide two endless conveyors with means for disposing the separate conveyors in close proximity to each other and to maintain the conveyors in substantially parallel relation with respect to each other in the path of movement thereof with respect to the grill and in close proximity to the grill; a further object being to provide means for manually actuating one of the conveyors to advance the feeding of the product being toasted or cooked, independent of the normal drive or feed of both conveyors; a further object being to provide means involving a variable speed gearing or transmission for operating the conveyors at different speeds; and with these and other objects in view, the invention consists in an apparatus of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a vertical sectional view through one form of my improved apparatus, the section being substantially on the line 1—1 of Fig. 2.

Fig. 2 is a vertical section of the apparatus shown in Fig. 1 substantially on the line 2—2 of said figure.

Fig. 3 is a section on the line 3—3 of Fig. 1, and showing the gear casing in section with part of the construction broken away.

Fig. 4 is a partial section on the line 4—4 of Fig. 3; and,

Fig. 5 is a perspective detail view of a split roll such as adapted to be toasted in the apparatus.

In the accompanying drawings, I have shown for the purpose of illustrating one method of carrying my invention into effect, a machine designed primarily for toasting rolls and similar food products. The machine comprises an oblong, rectangular casing 10 which may be constructed in any desired manner and which preferably has a window 11 at the front wall thereof to give vision to the products as they pass through the machine. The top of the machine has an elongated admission hopper 12 through which rolls or other products may be passed into the machine, and the lower portion of the casing has an outwardly and downwardly curved wall member or shoot 13 which extends to an opening 14 formed in the front of the casing, and whereby the products discharged from the machine shoot 13 may drop into and be collected in an elongated box or receiver 15 supported at the front lower end of the casing.

The machine may be supported upon a table, part of which is indicated at 16 in Fig. 1 of the drawings or may have any other conventional support. Mounted within the casing are two endless conveyors 17 and 18, the conveyors being in the form of a pair of chains 17a, 18a, disposed at opposite sides of the machine, the chains being connected at longitudinally spaced intervals by rods 17b, 18b. The pair of chains 17a of the conveyor 17 pass over a pair of drive sprockets 19 and over three idler sprockets 19a as clearly indicated in Fig. 1 of the drawings, whereas the pair of chains 18a pass around a pair of drive sprockets 20 and over idler sprockets 20a, the latter being arranged at the upper end of the machine.

It will be noted upon a consideration of Fig. 1 of the drawings that the adjacent surfaces of the conveyors 17, 18 are disposed in close proximity to each other and are held in substantially parallel relation to each other or against separation by pairs of vertically disposed guide strips 21 arranged in alinement with the chains 17a, 18a, as will also appear from a consideration of Fig. 3 of the drawing, the latter being supported in connection with upper and lower frame members 22 and 23 or brackets 24 secured thereto. It will thus be seen that the conveyors will be maintained against separation or spreading one with respect to the other in so far as the chains are concerned. However, the flexibility of the rods 17b and 18b employed, which are comparatively light, will permit the body portion of the conveyors proper to yield to uneven thicknesses of the rails or other products passed into the conveyors and move by such conveyors through the machine, it being understood that all that is essential in the successful operation of the machine is to support the rail or other food product against accidental displacement in the operation of slowly moving the same through the machine in the toasting or cooking operation.

Means is provided for driving the conveyors, and in the construction shown, an electric motor is mounted in the lower end of the casing beneath the bottom wall or shoot 13, and this motor actuates a drive gear 26 through a suitable gear reduction mechanism indicated at 27 to operate the drive gear 26 at the proper speed consistent with the desired operation of a machine of the class under consideration. The gear 26 may, as will be understood, be geared directly with the drive sprockets 19 and 20, but it is preferred that the drive be conducted through a variable speed or transmission gearing.

In practice, I provide, in a gear casing or housing 27 disposed at one side of the casing, a shaft 28 having a gear 29 meshing with the gear 26 to drive said shaft 28. Slidably mounted on and keyed to the shaft 28 is a gear unit consisting of gears 30, 30a, as well as an annularly grooved collar 31 adapted to receive the forked end 32 of an operating lever 33, which lever is employed to move the gear unit in position to produce the variable speed drives desired.

Rotatably mounted on the shaft 34 of the pair of drive sprockets 19 are gears 35 and 36 joined by a sleeve 35a. The outer surface of the gear 35 has a clutch sleeve 37 with which a clutch collar 38 is adapted to operate. A gear 39 is secured to the shaft 34 and the collar 38 is keyed to the shaft 34 through a pin and slot construction indicated at 40 in Fig. 3 of the drawings, the latter permitting movement of the collar 38 toward and from the clutch 37. A spring 41 is employed to hold the collar normally in engagement with the clutch 37. The gear 39 is in constant mesh with a gear 42 on the shaft 43 of the drive sprockets 20. The shaft 43 is provided outwardly of the gear housing 27 with a hand knob or similar member 44, by means of which the shaft 34 and 43 may be rotated to actuate the conveyors 17 and 18 independently of the drive mechanism of the machine, to quickly feed or advance a product through the machine or to relieve any congestion that might accidentally occur. The free or independent movement of the conveyors 18 is accomplished by reason of the fact that the clutch sleeve 38 is free to move over the clutch 37 of the gear 35, notwithstanding the fact that said gear 35 is in rotation through the motor and gearing employed.

In the normal or slow speed drive of the conveyors, the gear 30a meshes with the gear 35 in the manner seen in Figs. 2 and 3 of the drawings, whereas in the higher speed drive, the gear 30a is moved out of engagement with the gear 35 and the gear 30 moved into engagement with the gear 36 through the action of the clutch operating lever or rod 33.

Arranged within the casing on a suitable frame 45 consisting of vertical and horizontal angle iron or other strips, is a suitable heating medium which in the construction shown is in the form of two gas burner tubes 46 and 47, above each of which is mounted a series of heat reflecting or radiating members in the form of slabs, plates or the like 48, three of these plates being disposed in each series. The plates are composed of suitable refractory material, the outer surface of which will have relatively small projecting members 49 which will produce a glow and also intensify and widely distribute the heat radiation over a comparatively large area of the casing adjacent and inwardly of that part of the conveyor 17 which travels in parallelism with the conveyor 18.

The side edges of the plates 48 are reduced as indicated at 48a, note Fig. 3, to receive strips 50 which loosely support said plates in position within the casing, preferably in an angular position such as that indicated in Fig. 1 of the drawings so as to dispose the protruding parts 49 above the flame of the burner tubes 46 and 47. At one side of the casing is a gas supply pipe 51 which is coupled with a suitable source of supply. Valves 52 and 53 are employed in extensions from the pipe 51 to control and regulate the supply of gas to the burner tubes 46 and 47. With this construction, the flame of each burner tube may be separately regulated.

At this time, it will also be apparent that the valves 52 and 53 will be operated consistently with the speeds of drive of the conveyors to produce in both the slow and high speed operation thereof, the desired toasting or cooking effects upon the products fed through the machine by such conveyors.

Adjacent the sprocket 19 is a stripping or ejector plate 54 and a similar plate 55 is disposed adjacent the sprocket 20 so that the discharge of rolls or other products from the conveyors onto the shoot 13 and thus into the receptacle 15 may be insured.

My invention is not necessarily limited to the specific type of heating medium herein shown and described nor to the particular type and arrangement of plate 48. Furthermore, while the machine as herein illustrated is designed primarily for use in toasting rolls and like food products, it may be used to toast or cook other types of products in the manner or in accordance with the principle of operation of the machine herein illustrated.

In Fig. 5 of the drawings, I have shown a conventional type of roll 56 which has been split or cut centrally and longitudinally to dispose the separate halves 56a and 56b thereof side by side and to arrange the resultant flat cut surface 56c at one side of the resulting product and the rounded or irregular surface or surfaces 56d at the opposite side thereof. The rolls thus prepared are placed into the machine through the hopper or feed tube 12 with the flat surfaces 56 arranged in the direction of the conveyor 17 and with the rounded or irregular surfaces 56d disposed in the direction of the conveyor 18.

In the operation of the machine, the conveyors will pick up the rolls placed in the machine as above stated and convey the same downwardly over the heating medium or element employed, which, as described, consists of two burners 46 and 47 and the heat radiating surfaces or areas 48—49 thereof. Both conveyors are driven at the same or substantially the same speed so that there will be no normal relative movement of the conveyors with respect to the product being toasted or cooked. As before stated, the conveyors may be driven at one of two speeds through the clutch mechanism employed and still further, the conveyors 17 and 18 may be advanced by hand through the operation of the knob 44 to feed the roll or other product quickly through the machine whenever desired.

By regulation of the burners or heat radiating units controlled through the valves 52—53, any predetermined or desired comparison of heating may be provided to suit the particular product being toasted or cooked. By this I mean that the burner 46 controlled by the valve 52 may be adjusted to a high degree of heat and the burner 47 to a lower degree of heat or vice versa. Suitable means may be provided to insulate the walls of the casing to prevent excessive heat radiation as well as to insulate any other desired parts of the apparatus.

The two conveyors 17 and 18 employed form what may be termed flexible grills presenting relatively wide grill surfaces transversely of the machine, the said surfaces operating as means for supporting as well as conveying the products through the machine. The conveyors or flexible grills consist primarily of the transverse rods flexibly coupled at their ends, preferably by chains, the latter, in the construction shown, serving as the means for driving or operating the conveyors.

Having fully described my invention, what I claim as new and desire to secure by Letters Patent, is:

1. A machine of the class described comprising a casing, two endless conveyors in said casing having portions thereof arranged adjacent each other, means for maintaining adjacent portions of the separate conveyors in close proximity to each other and in substantially parallel relation throughout a substantial length of the separate conveyors and to prevent displacement of the conveyors throughout such length, means for operating the conveyors at substantially the same speed from a common driving source with the adjacent portions thereof travelling in the same direction, and means disposed adjacent said first named means for radiating heat onto said conveyors.

2. A machine of the class described comprising a casing, two endless conveyors in said casing having portions thereof arranged adjacent each other, means for maintaining adjacent portions of the separate conveyors in close proximity to each other and in substantially parallel relation throughout a substantial length of the separate conveyors and to prevent displacement of the conveyors throughout such length, means for operating the conveyors at substantially the same speed from a common driving source with the adjacent portions thereof travelling in the same direction, means disposed adjacent said first named means for radiating heat onto said conveyors, and said last named means comprising two heating units disposed in spaced relation longitudinally of the path of movement of said conveyors.

3. A machine of the class described comprising a casing, two endless conveyors in said casing having portions thereof arranged adjacent each other, means for maintaining adjacent portions of the separate conveyors in close proximity to each other and in substantially parallel relation throughout a substantial length of the separate conveyors and to prevent displacement of the conveyors throughout such length, means for operating the conveyors at substantially the same speed from a common driving source with the adjacent portions thereof travelling in the same direction, means disposed adjacent said first named means for radiating heat onto said conveyors, said last named means comprising two heating units disposed in spaced relation longitudinally of the path of movement of said conveyors, and means for independently adjusting said heating units.

4. A machine of the class described comprising a casing, two endless conveyors in said casing having portions thereof arranged adjacent each other, means for maintaining adjacent portions of the separate conveyors in close proximity to each other and in substantially parallel relation through a substantial length of the separate conveyors and to prevent displacement of the conveyors throughout such length, means for operating the conveyors at substantially the same speed from a common driving source with the adjacent portions thereof travelling in the same direction, means disposed adjacent said first named means for radiating heat onto said conveyors, said last named means comprising two heating units disposed in spaced relation longitudinally of the path of movement of said conveyors, means for independently adjusting said heating units, and said conveyor operating means including a manually actuated transmission mechanism for operating the conveyors at different speeds.

5. A machine of the class described comprising a casing, two endless conveyors in said casing having portions thereof arranged adjacent each other, means for maintaining adjacent portions of the separate conveyors in close proximity to each other and in substantially parallel relation through a substantial length of the separate conveyors and to prevent displacement of the conveyors throughout such length, means for operating the conveyors at substantially the same speed from a common driving source with the adjacent portions thereof travelling in the same direction, means disposed adjacent said first named means for radiating heat onto said conveyors, said last named means comprising two heating units disposed in spaced relation longitudinally of the path of movement of said conveyors, means for independently adjusting said heating units, said conveyor operating means including a manually actuated transmission mechanism for operating the conveyors at different speeds, and said conveyors being driven through a clutch mechanism, and means including said clutch mechanism for manually actuating the conveyors independent of said operating means and transmission.

6. A machine of the class described comprising a casing, two endless conveyors arranged in said casing having portions thereof arranged adjacent each other, each conveyor consisting of a pair of chains disposed one at each side of the casing and a plurality of rods coupling the chains of each pair at longitudinally spaced intervals to form of the conveyors between the chains openwork grills extending across the major part of the width of the casing, means for guiding and supporting the separate adjacent portions of the conveyors in close proximity to each other throughout the major portion of the length of the casing to form a relatively long and wide grill area the adjacent portions of the conveyor being operated in one direction to feed food products therebetween, and means adjacent said grill area for radiating heat in the direction thereof.

7. A machine of the class described comprising a casing, two endless conveyors arranged in said casing having portions thereof arranged adjacent each other, each conveyor consisting of a pair of chains disposed one at each side of the casing and a plurality of rods coupling the chains of each pair at longitudinally spaced intervals to form of the conveyors between the chains openwork grills extending across the major part of the width of the casing, means for guiding and supporting the separate adjacent portions of the conveyors in close proximity to each other throughout the major portion of the length of the casing to form a relatively long and wide grill area the adjacent portions of the conveyor being operated in one direction to feed food products therebetween, means adjacent said grill area for radiating heat in the direction thereof, and said last named means including independently regulated heating units.

8. A machine of the class described comprising a casing, two endless conveyors arranged in said casing, each conveyor consisting of a pair of chains disposed one at each side of the casing and a plurality of rods coupling the chains of each pair at longitudinally spaced intervals to form of the conveyors between the chains openwork grills extending across the major part of the width of the casing, means for guiding and supporting the separate conveyors in close proximity to each other throughout the major portion of the length of the casing to form a relatively long and wide grill area, means adjacent said grill area for radiating heat in the direction thereof, said last named means including independently regulated heating units, each unit consisting of an elongated burner tube and a plurality of heat reflecting plates disposed above the burner tube in an upwardly inclined plane.

9. A machine of the class described comprising a casing, two endless conveyors arranged in said casing having portions thereof arranged adjacent each other, each conveyor consisting of a pair of chains disposed one at each side of the casing and a plurality of rods coupling the chains of each pair at longitudinally spaced intervals to form of the conveyors between the chains openwork grills extending across the major part of the width of the casing, means for guiding and supporting the separate adjacent portions of the conveyors in close proximity to each other throughout the major portion of the length of the casing to form a relatively long and wide grill area the adjacent portions of the conveyor being operated in one direction to feed food products therebetween, means adjacent said grill area for radiating heat in the direction thereof, said last named means including independently regulated heating units, and means including an electric motor and a transmission gearing for actuating said conveyors.

10. A machine of the class described comprising a casing, two endless conveyors arranged in said casing having portions thereof arranged adjacent each other, each conveyor consisting of a pair of chains disposed one at each side of the casing and a plurality of rods coupling the chains of each pair at longitudinally spaced intervals to form of the conveyors between the chains openwork grills extending across the major part of the width of the casing, means for guiding and supporting the separate adjacent portions of the conveyors in close proximity to each other throughout the major portion of the length of the casing to form a relatively long and wide grill area the adjacent portions of the conveyor being operated in one direction to feed food products therebetween, means adjacent said grill area for radiating heat in the direction thereof, said last named means including independently regulated heating units, means including an electric motor and a transmission gearing for actuating said conveyors, means at one end of the casing for introducing products between said conveyors, for introducing products between said conveyors, and means at the other end of the casing for discharging the products from the conveyors into a suitable receptacle.

11. A machine of the class described comprising a casing, two endless conveyors arranged in said casing having portions thereof arranged adjacent each other, each conveyor consisting of a pair of chains disposed one at each side of the casing and a plurality of rods coupling the chains of each pair at longitudinally spaced intervals to form of the conveyors between the chains openwork grills extending across the major part of the width of the casing, means for guiding and supporting the separate adjacent portions of the conveyors in close proximity to each other throughout the major portion of the length of the casing to form a relatively long and wide grill area the adjacent portions of the conveyor being operated in one direction to feed food products therebetween, means adjacent said grill area for radiating heat in the direction thereof, said last named means including independently regulating heating units, means including an electric motor and a transmission gearing for actuating said conveyors, means at one end of the casing for introducing products between said conveyors, means at the other end of the casing for discharging the products from the conveyors into a suitable receptacle, and means including a clutch mechanism for manually operating said conveyors independent of the motor operation thereof.

12. In a machine of the class described, a source of heat radiation, two flexible grills in the form of endless conveyors, means for supporting portions of said grills in close proximity and parallel relation to each other throughout a predetermined length thereof and adjacent said source of heat radiation, and means for operating the parallel portions of said conveyor grills in one direction to move a product disposed between the parallel portions thereof for exposure to said source of heat radiation.

13. In a machine of the class described, a source of heat radiation, two flexible grills in the form of endless conveyors, means for supporting portions of said grills in close proximity and parallel relation to each other throughout a predetermined length thereof and adjacent said source of heat radiation, means for operating the parallel portions of said conveyor grills in one direction to move a product disposed between the parallel portions thereof for exposure to said source of heat radiation, and manually controlled means for varying the speed of operation of said conveyors.

14. In a machine of the class described, a source of heat radiation, two flexible grills in the form of endless conveyors, means for supporting portions of said grills in close proximity and parallel relation to each other throughout a predetermined length thereof and adjacent said source of heat radiation, means for operating the parallel portions of said conveyor grills in one direction to move a product disposed between the parallel portions thereof for exposure to said source of heat radiation, manually controlled means for varying the speed of operation of said conveyors, and means for regulating the temperature of said source of heat radiation.

15. In a machine of the class described, a source of heat radiation, two flexible grills in the form of endless conveyors, means for supporting portions of said grills in close proximity and parallel relation to each other throughout a predetermined length thereof and adjacent said source of hat radiation, means for operating the parallel portions of said conveyor grills in one direction to move a product disposed between the parallel portions thereof for exposure to said source of heat radiation, manually controlled means for varying the speed of operation of said conveyors, means for regulating the temperature of said source of heat radiation, and means including a clutch for manually operating said conveyors independent of the normal operation thereof.

16. In a toasting machine, a casing, means at one end of the casing for admitting the products to be toasted thereinto, means at the other end portion of the casing for discharging the toasted products therefrom, two endless conveyor grills movably mounted in the casing, means for guiding sections of said grills through a substantially parallel path between the product admission means at one end of the casing and the discharge means at the other end thereof, said conveyor grills comprising a plurality of longitudinally spaced rods flexibly connected at the end portions thereof, means for operating the parallel sections of said conveyors in one direction and in synchronism, and heat radiating means in the casing adjacent the parallel sections of the conveyors.

17. In a toasting machine, a casing, means at one end of the casing for admitting the products to be toasted thereinto, means at the other end portion of the casing for discharging the toasted products therefrom, two endless conveyor grills movably mounted in the casing, means for guiding sections of said grills through a substantially parallel path between the product admission means at one end of the casing and the discharge means at the other other end thereof, said conveyor grills comprising a plurality of longitudinally spaced rods flexibly connected at the end portions thereof, means for operating the parallel sections of said conveyors in one direction and in synchronism, heat radiating means in the casing adjacent the parallel sections of the conveyors, and means including a variable speed transmission for operating said conveyors at different speeds.

18. The combination with two heat radiating units having independent regulating means, of two conveyor grills having adjacent sections movable in one direction across the heat radiating units in parallel relation one with respect to the other, and means for operating said conveyor grills in synchronism.

19. The combination with two heat radiating units having independent regulating means, of two conveyor grills having adjacent sections movable in one direction across the heat radiating units in parallel relation one with respect to the other, means for operating said conveyor grills in synchronism, and said last named means including means for operating the conveyor grills at different speeds.

20. The combination with two heat radiating units having independent regulating means, of two conveyor grills having adjacent sections movable in one direction across the heat radiating units in parallel relation one with respect to the other, means for operating said conveyor grills in synchronism, said last named means including means for operating the conveyor grills at different speeds, and means involving a clutch for manually actuating said conveyor grills independent of the mechanical operation thereof.

CHARLES A. FELTMAN.